(12) United States Patent
Stefan

(10) Patent No.: US 10,093,553 B1
(45) Date of Patent: Oct. 9, 2018

(54) SOLAR POWERED WATER PURIFIER

(71) Applicant: Antony W. Stefan, Sarasota, FL (US)

(72) Inventor: Antony W. Stefan, Sarasota, FL (US)

(*) Notice: Subject to any disclaimer, the term of this patent is extended or adjusted under 35 U.S.C. 154(b) by 0 days.

(21) Appl. No.: 15/400,292

(22) Filed: Jan. 6, 2017

Related U.S. Application Data

(63) Continuation-in-part of application No. 14/615,475, filed on Feb. 6, 2015.

(51) Int. Cl.
| | | |
|---|---|---|
| *C02F 1/14* | (2006.01) | |
| *C02F 1/18* | (2006.01) | |
| *C02F 1/04* | (2006.01) | |
| *B01D 1/00* | (2006.01) | |
| *B01D 5/00* | (2006.01) | |

(52) U.S. Cl.
CPC .............. *C02F 1/14* (2013.01); *B01D 1/0035* (2013.01); *B01D 5/006* (2013.01); *B01D 5/009* (2013.01); *C02F 1/043* (2013.01); *C02F 1/18* (2013.01)

(58) Field of Classification Search
CPC ... C02F 1/14; C02F 1/18; C02F 1/043; B01D 1/0035; B01D 5/0066; B01D 5/006; B01D 5/009
See application file for complete search history.

(56) References Cited

U.S. PATENT DOCUMENTS

| | | | |
|---|---|---|---|
| 2,342,062 A | 2/1944 | Schenk | |
| 2,848,389 A | 8/1958 | Bjorksten | |
| 3,337,418 A * | 8/1967 | Halacy, Jr. ................. | C02F 1/14 126/680 |
| 3,351,536 A | 11/1967 | Fox | |
| 3,408,260 A | 10/1968 | Feldman et al. | |
| 3,655,517 A | 4/1972 | Henseley, Jr. et al. | |
| 3,801,474 A * | 4/1974 | Castellucci .......... | B01D 5/0066 159/903 |
| 3,846,251 A * | 11/1974 | Hay ......................... | B01D 3/00 202/234 |
| 3,870,605 A | 3/1975 | Sakamoto | |
| 4,075,063 A | 2/1978 | Tsay et al. | |
| 4,276,122 A | 6/1981 | Snyder | |
| 4,313,457 A * | 2/1982 | Cliff ....................... | E03B 11/12 137/312 |

(Continued)

FOREIGN PATENT DOCUMENTS

CN 203498115 3/2014

OTHER PUBLICATIONS

Williams, Trip. "High Capacity Solar Still." High Capacity Solar Still. Alpha Disaster Contengencies, Nov. 10, 2005. Web. Feb 1, 2006. (Note: A publication date of Feb. 1, 2006 has been verified using the Wayback Machine).*

(Continued)

*Primary Examiner* — Bobby Ramdhanie
*Assistant Examiner* — Briana M Obenhuber
(74) *Attorney, Agent, or Firm* — Edward M. Livingston, Esq.; Bryan L. Loeffler, Esq.; Livingston Loeffler, P.A.

(57) ABSTRACT

A solar powered water purifier (1) having a main reservoir (2) for holding unpurified water (18), a collection tube (22) supported within the main reservoir and an inverted conical-shaped lid (11). The conical-shaped lid captures evaporated water from the main reservoir in the form of condensation and directs the condensation toward the collection tube for collection, which diverts water from to outside of the main reservoir for storage and/or use.

5 Claims, 3 Drawing Sheets

(56) References Cited

U.S. PATENT DOCUMENTS

| | | | |
|---|---|---|---|
| 4,450,966 | A | 5/1984 | Villavicencio, Jr. et al. |
| 4,495,034 | A | 1/1985 | Lucas |
| 4,809,734 | A * | 3/1989 | Cliff ........................ E03B 11/12 |
| | | | 137/312 |
| 4,966,655 | A | 10/1990 | Wilkerson, Jr. |
| 5,053,110 | A | 10/1991 | Deutsch |
| 5,158,650 | A | 10/1992 | Wilkerson |
| 8,341,961 | B2 | 1/2013 | Glynn |

OTHER PUBLICATIONS

Susan Schleith and Penny Hall. "Rain Machine (Solar Still)." Solar Matters II. Florida Solar Energy Center. Web. Jan. 13, 2007. <http://www.fsec.ucf.edu/en/education/k-12/curricula/sm2/documents/>. (Note: A publication date of Jan. 13, 2007 has been verified using the Wayback Machine, see NPL "Rain Machine (Solar Still) Access page").*

* cited by examiner

SOLAR POWERED WATER PURIFIER

CROSS-REFERENCE TO RELATED APPLICATIONS

This application is a continuation-in-part application of U.S. patent application Ser. No. 14/615,475 filed on Feb. 6, 2015 which is currently pending. The patent application identified above is incorporated herein by reference in its entirety to provide continuity of disclosure.

FIELD OF THE INVENTION

The field of invention relates to water purifiers and distillers, and more particularly, to a solar powered water purifier that does not require electricity, chemicals or filters and is portable.

BACKGROUND OF THE INVENTION

The importance of having water purification systems is especially critical in developing countries, remote areas and/or disaster areas where clean water is scarce.

Some drawbacks of conventional water purifiers and methods for purifying water include power requirements, the use of chemicals, non-portability of devices and limits lifetime components, such as filters. All of these drawbacks are routine maintenance concerns in developed countries, but make conventional water purifiers infeasible in such locations.

For example, filters are expensive to manufacture and require frequent replacement as the pores become clogged. Systems that require pumps, ultra violet lamps and so forth, require electricity, which might not be available in remote areas. Methods that use chemicals to purify the water may introduce potentially toxic chemicals to the water with the resulting water having a chemical taste. In addition, the chemicals must be accurately measured. Other drawbacks include that chemicals are often consumable and must be constantly resupplied.

Therefore, a need exists for a solar powered water purifier that does not require electricity, chemicals or filters and is portable. Furthermore, a need exists for a solar powered water purifier that may be manufactured from components having simpler geometries that are less complicated to fabricate.

The relevant prior art includes the following references:

| Pat. No. | Inventor | Issue/Publication Date |
|---|---|---|
| (U.S. Patent References) | | |
| 2,342,062 | Schenk | Feb. 15, 1944 |
| 2,848,389 | Bjorksten | Aug. 19, 1958 |
| 3,351,536 | Fox | Nov. 7, 1967 |
| 3,408,260 | Feldman et al. | Oct. 29, 1968 |
| 3,655,517 | Henseley, Jr. et al. | Apr. 11, 1972 |
| 3,870,605 | Sakamoto | Mar. 11, 1975 |
| 4,075,063 | Tsay et al. | Feb. 21, 1978 |
| 4,276,122 | Snyder | Jun. 30, 1981 |
| 4,450,966 | Villavicencio, Jr. et al. | May 29, 1984 |
| 4,495,034 | Lucas | Jan. 22, 1985 |
| 4,966,655 | Wilkerson, Jr. | Oct. 30, 1990 |
| 5,053,110 | Deutsch | Oct. 1, 1991 |
| 5,158,650 | Wilkerson | Oct. 27, 1992 |
| 8,341,961 | Glynn | Jan. 1, 2013 |
| (Foreign Patent References) | | |
| CN203498115 | N/A | Mar. 26, 2014 |

SUMMARY OF THE INVENTION

The objects of the present invention are to provide a solar powered water purifier that does not require electricity, chemicals or filters and is portable.

The present invention fulfills the above and other objects by providing a solar powered water purifier having a main reservoir for holding unpurified water, a central collection cup supported within the main reservoir and a preferably transparent inverted conical-shaped lid. Said main reservoir has a preferably circular side wall with an upper edge that supports the collection cup via one or more arms extending from the upper edge of the side wall to the collection cup. The one or more arms may be integral to the device or a separate assembly having an outer rim or outer ring from which the one or more arms extend from either directly to the collection cup or to an inner ring which supports the collection cup. The outer rim or outer ring is supported by the upper edge of the side wall. The collection cup is preferably located below the rim of the main reservoir to allow space for an apex of the inverted conical-shaped lid to rest directly above the collection cup. The conical-shaped lid captures evaporated water from the main reservoir in the form of condensation and directs the condensation toward the collection cup for collection. A drain tube extends from the collection cup through the main reservoir and diverts water from the collection cup to outside the main reservoir for storage and/or use.

Alternatively, collected condensation on the conical-shaped lid may be directed into a collection tube mounted in an angled or sloped position in relation to a horizontal base of the reservoir. An aperture is located on the collection tube and positioned directly below the apex of the inverted conical-shaped lid. Water collected in the collection tube is directed through the collection tube and out of the reservoir to a desired collection vessel used for storing the purified water.

The solar powered water purifier of the present invention is preferably constructed out of materials, such as glass, metal and so forth, that do not absorb contaminants from unpurified water and/or release contaminants into the water.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
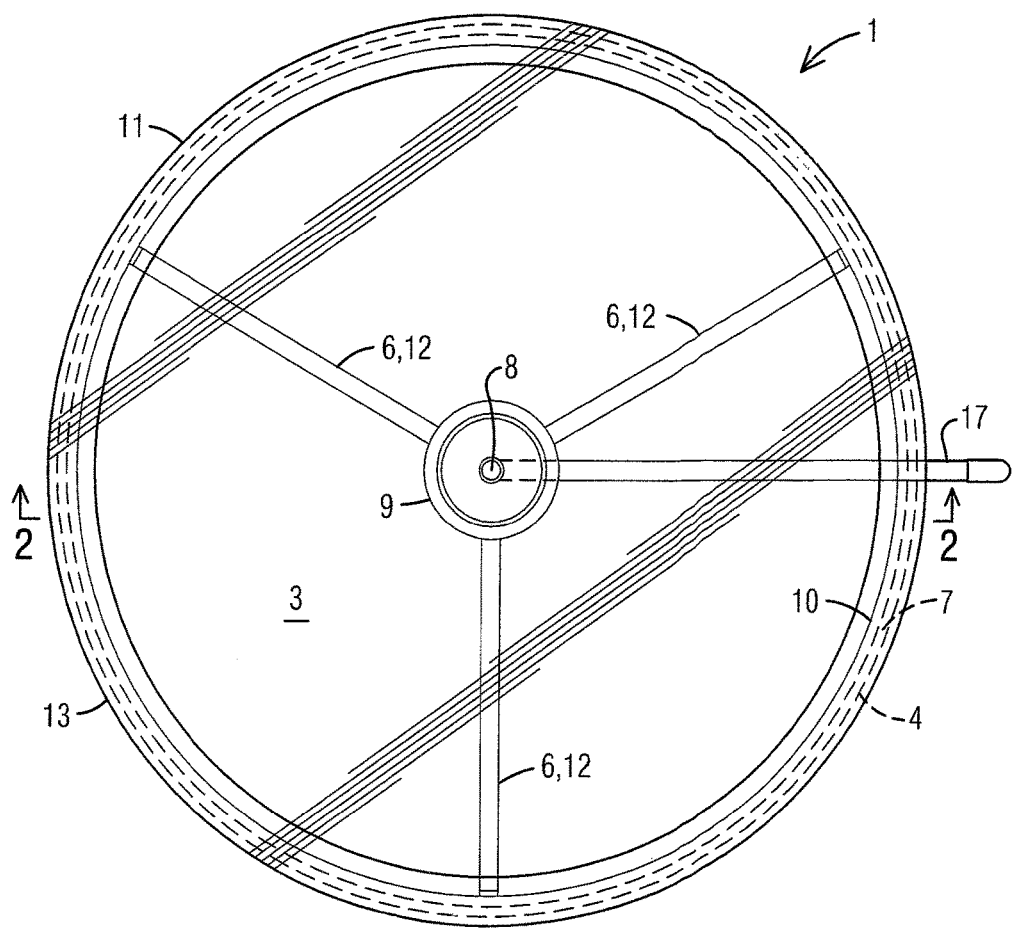
FIG. 1 is a top view of a solar powered water purifier of the present invention.
Figure 2:
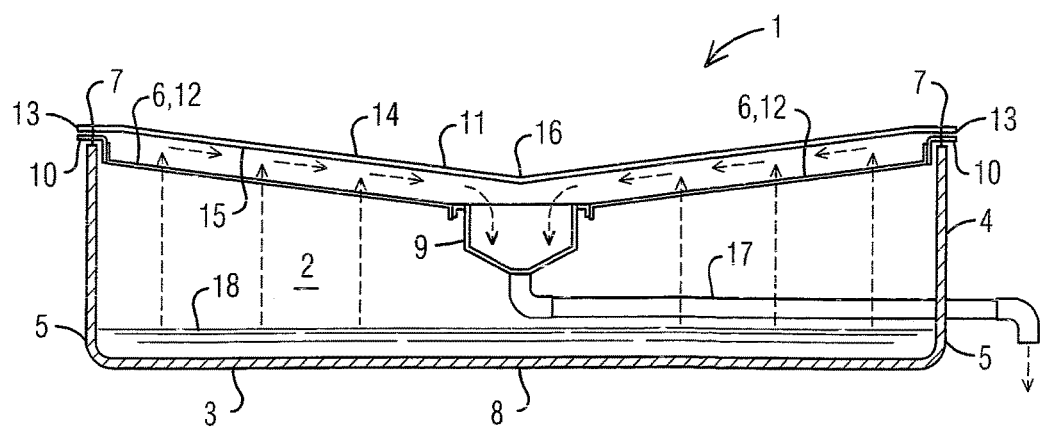
FIG. 2 is a side cross sectional view along line 2-2 of FIG. 1 of the solar powered water purifier of the present invention.
Figure 3:
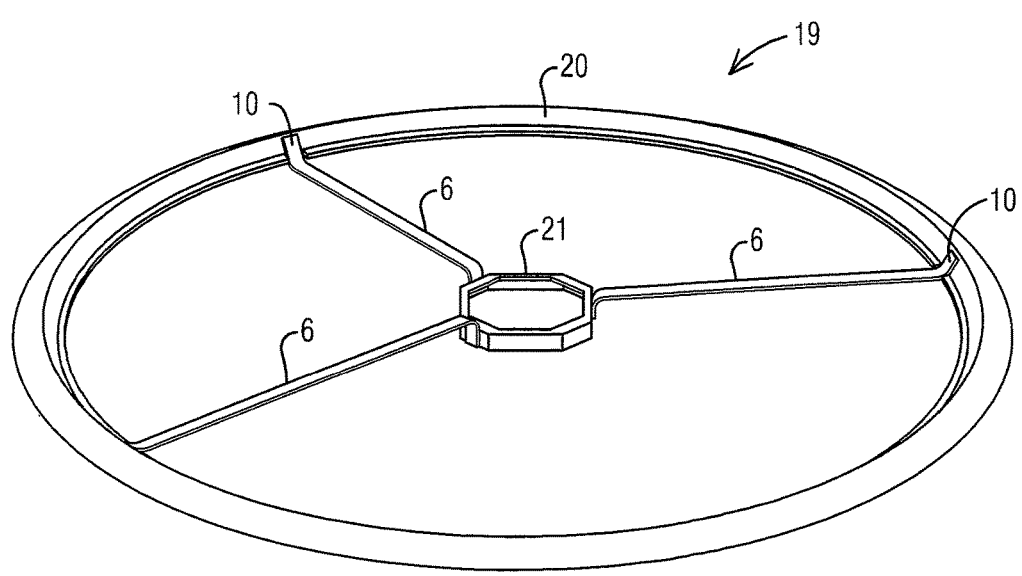
FIG. 3 is a perspective top view of a support assembly of the present invention.

For purposes of describing the preferred embodiment, the terminology used in reference to the numbered components in the drawings is as follows:
1. solar powered water purifier, generally
2. main reservoir
3. base
4. side wall
5. perimeter edge of base
6. support arm
7. upper edge of side wall
8. central point of water purifier
9. central collection cup
10. L-shaped bracket
11. conical-shaped lid
12. support means
13. perimeter edge of conical-shaped lid
14. upper surface of conical-shaped lid
15. lower surface of conical-shaped lid
16. apex of lid
17. drain tube
18. unfiltered water
19. support assembly
20. outer ring
21. inner ring
22. collection tube
23. top end of collection tube
24. collection aperture
25. side wall of collection tube
26. cap With reference to FIGS. 1-3, a top view of a solar powered water purifier 1 of the present invention, a side cross sectional view along line 2-2 of FIG. 1 of the present invention and a perspective top view of a support assembly 19 of the present invention, respectively, are illustrated. The solar powered water purifier 1 comprises a main reservoir, 2 for holding unpurified water 18 to be purified, having a preferably planar base 3 with a side wall 4 extending upward a predetermined distance from a perimeter edge 5 of the base 3. Said planar base 3 may be circular-shaped. One or more support arms 6 extend inward from the side wall 4 proximal to an upper edge 7 of the side wall 4 to a central point 8 above the base 3 to support a central collection cup 9 within the main reservoir 2. The one or more support arms 6 may be integral to the solar powered water purifier 1 or a separate support assembly 19 having an outer rim or outer ring 20 from which the one or more support arms 6 extend from either directly to the collection cup 9 or to an inner ring 21 which supports the collection cup 9. The outer rim or outer ring 20 is supported by the upper edge 7 of the side wall 4. The one or more support arms 6 may angle downward toward the central point 8 to support the central collection cup 9 within the main reservoir 2 in a raised position below the upper edge 7 of the side wall 4. The one or more support arms 6 may also comprise L-shaped brackets 10 that allow one or more support arms 6 to extend from a position that is below the upper edge 7 of the side wall 4. The collection cup 9 may be supported by a support means 12, such as the one or more support arms described above or an alternative support means 12, such as directly on the planar base 3, an extension located on the planar base 3 that creates a pedestal or shelf for the collection cup 9 to rest on or so forth.

An inverted conical-shaped lid 11 is supported by the upper edge 7 of the side wall 4. The inverted conical-shaped lid 11 comprises a perimeter edge 13, an upper surface 14, a lower surface 15 and an apex 16 that points downward toward the central collection cup 9. The inverted conical-shaped lid 11 is preferably constructed from a transparent material, such as glass. The inverted conical-shaped lid 11 captures evaporated water from the unpurified water 18 in the main reservoir 2 in the form of condensation that forms on the lower surface 15 and directs the condensation toward the apex 16 where it drips into the central collection cup 9. The inverted conical-shaped lid 11 is preferably constructed or may have a coating to optimize surface adhesion to facilitate condensation flow toward the apex 16. The one or more support arms 6 support the central collection cup 9 without blocking the evaporation of water and collection of condensation on the lower surface 15 of the inverted conical-shaped lid 11. The main reservoir 2 preferably has a dark non-reflective coating, such as black, to absorb heat and heat the unpurified water 18.

A drain tube 17 extends from the central collection cup 9 through the main reservoir 2 and diverts water from the central collection cup 9 to outside of the main reservoir 2 for storage and/or use.

Figure 4:
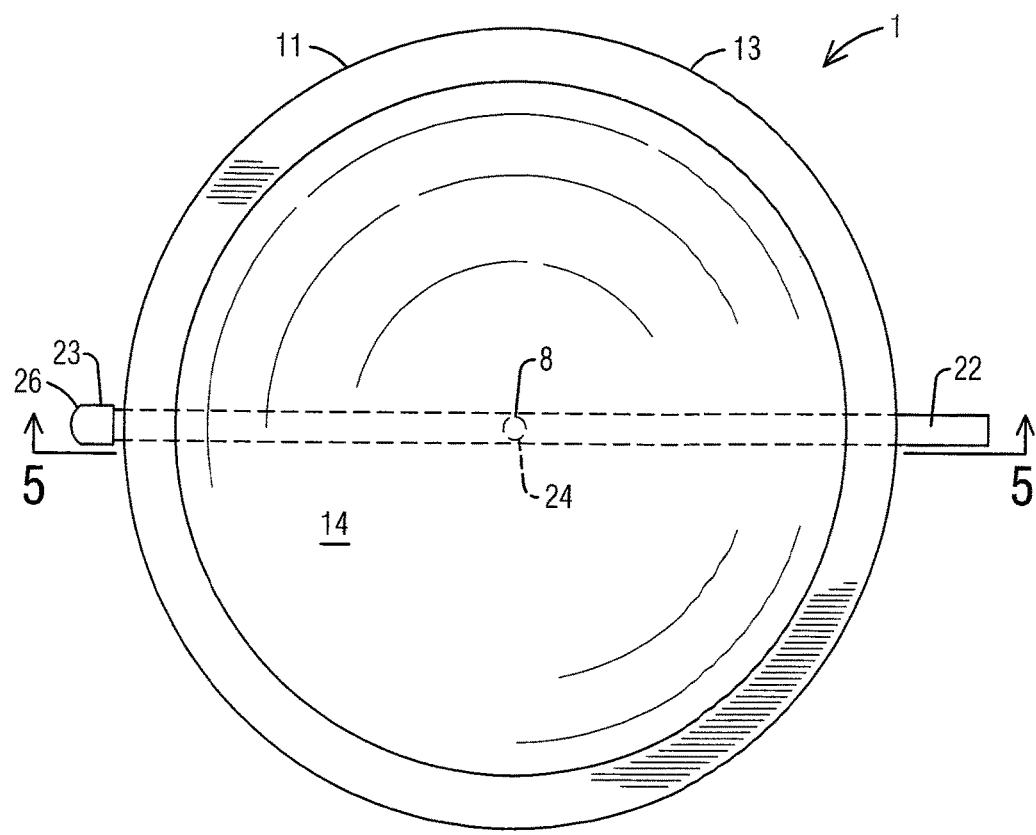
FIG. 4 is a top view of a solar powered water purifier of the present invention having a collection tube.
Figure 5:
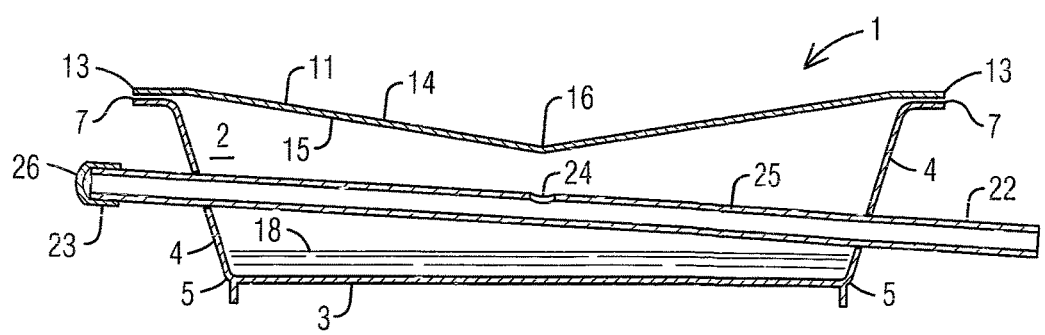
FIG. 5 is a side cross sectional view along line 5-5 of FIG. 4 of the solar powered water purifier of the present invention having a collection tube.

With reference to FIGS. 4 and 5, a top view and a side cross sectional view along line 5-5 of FIG. 4, respectively, of the present invention having a collection tube 22 are illustrated. The solar powered water purifier 1 comprises a main reservoir 2 for holding unpurified water 18 to be purified, having a preferably planar base 3 with a side wall 4 extending upward a predetermined distance from a perimeter edge 5 of the base 3. Said planar base 3 may be circular-shaped.

An inverted conical-shaped lid 11 is supported by the upper edge 7 of the side wall 4. The inverted conical-shaped lid 11 comprises a perimeter edge 13, an upper surface 14, a lower surface 15 and an apex 16 that points downward toward a collection aperture 24 located on a side wall 25 of the collection tube 22. The inverted conical-shaped lid 11 is preferably constructed form a transparent material, such as glass. The inverted conical-shaped lid 11 captures evaporated water from the unpurified water 18 in the main reservoir 2 in the form of condensation that forms on the lower surface 15 and directs the condensation toward the apex 16 where it drips into the collection aperture 24 of the collection tube 22. The inverted conical-shaped lid 11 is preferably constructed or may have a coating to optimize surface adhesion to facilitate condensation flow toward the apex 16. The main reservoir 2 preferably has a dark non-reflective coating, such as black, to absorb heat and heat the unpurified water 18.

Collected condensation on the conical-shaped lid 11 is directed into the collection tube 22. The collection tube 22 is mounted in an angled or sloped position in relation to a horizontal base 3 of the reservoir 2. A top end 23 of the collection tube 22 is supported in an elevated position above the horizontal base 3 of the reservoir 2. The top end 23 of the collection tube 22 may be supported by the side wall 4 of the reservoir 2 or by another support means. The collection tube 22 extends downward from the top end 23 at an angle toward the perimeter edge 5 of the base 3 and exits through the side wall 4. A collection aperture 24 is located on a side wall 25 of the collection tube 22 and positioned directly below the apex 16 of the inverted conical-shaped lid 11. Water collected in the collection tube 22 is directed through the collection tube 22 and out of the reservoir 2 to a desired collection vessel used for storing the purified water. The top end 23 of the collection tube 22 may be sealed using a removable cap 26.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A water purifier comprising:
 a main reservoir for holding unpurified water to be purified having a planar base with a side wall extending upward a predetermined distance from a perimeter edge of the planar base;
 an elongated straight collection tube located within the main reservoir;
 said collection tube is in an angled position within the main reservoir;
 an inverted conical-shaped lid supported above the main reservoir for capturing evaporated water from the unpurified water in the main reservoir in the form of condensation;
 said inverted conical-shaped lid having a perimeter edge, an upper surface, a lower surface and an apex that points downward toward the collection tube;
 an aperture located on a side wall of said collection tube;
 said aperture being positioned under the apex of the conical-shaped lid so the condensation that forms on the lower surface is directed toward the apex where it drips into the aperture of the collection tube;
 a top end of the collection tube is supported by the side wall of the main reservoir in an elevated position above the planar base of the main reservoir; and
 said collection tube extends downward from the top end and side wall where the collection tube is being supported at an angle toward the perimeter edge of the planar base and exits through the side wall on an opposing side of the side wall from where the top end of the collection tube is being supported by the side wall.

2. The solar powered water purifier of claim 1 wherein: said inverted conical-shaped lid is made of a transparent material.

3. The solar powered water purifier of claim 1 wherein: said main reservoir comprises a non-reflective color.

4. A water purifier comprising:
 a main reservoir for holding unpurified water to be purified having a planar base with a side wall extending upward a predetermined distance from a perimeter edge of the planar base;
 an elongated straight collection tube having a top end located outside of the main reservoir wherein said collection tube extends from said top end through a first aperture located on the side wall at a downward angle across the main reservoir to an opposing side of the side wall and exits through a second aperture located on the opposing side of the side wall;
 an inverted conical-shaped lid for capturing evaporated water from the unpurified water in the main reservoir in the form of condensation supported above the main reservoir;
 said inverted conical-shaped lid having a perimeter edge, an upper surface, a lower surface and an apex that points downward toward the collection tube; and
 an aperture located on a side wall of said collection tube positioned under the apex of the conical-shaped lid so the condensation that forms on the lower surface is directed toward the apex where it drips into the aperture of the collection tube.

5. A water purifier comprising:
 a main reservoir for holding unpurified water to be purified having a planar base with a side wall extending upward a predetermined distance from a perimeter edge of the planar base;
 an elongated straight collection tube having a top end located outside of the main reservoir wherein said collection tube extends from said top end through a first aperture located on the side wall at a downward angle across the main reservoir to an opposing side of the side wall and exits through a second aperture located on the opposing side of the side wall;
 said first aperture located on the side wall is located higher on the side wall in relation to a location of the second aperture on the side wall;
 an inverted conical-shaped lid for capturing evaporated water from the unpurified water in the main reservoir in the form of condensation supported above the main reservoir;
 said inverted conical-shaped lid having a perimeter edge, an upper surface, a lower surface and an apex that points downward toward the collection tube; and
 an aperture located on a side wall of said collection tube positioned under the apex of the conical-shaped lid so the condensation that forms on the lower surface is directed toward the apex where it drips into the aperture of the collection tube.

* * * * *